L. S. Chichester,
Lemon Squeezer,
Nº 28,967.           Patented July 3, 1860.
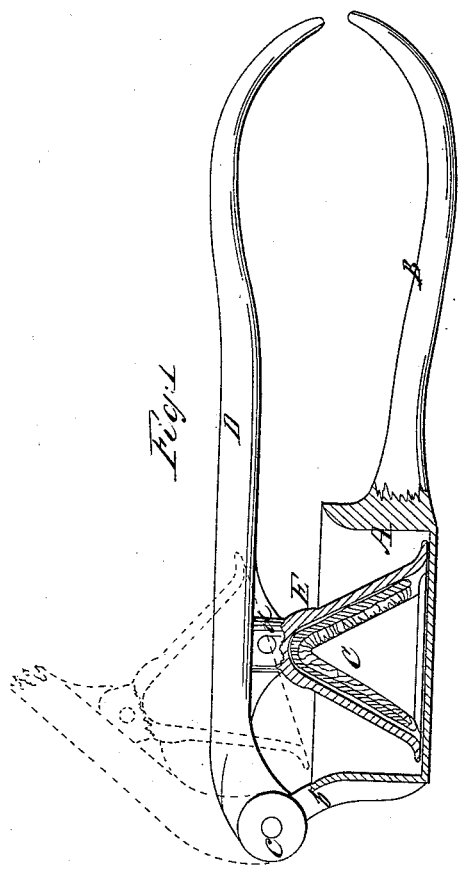
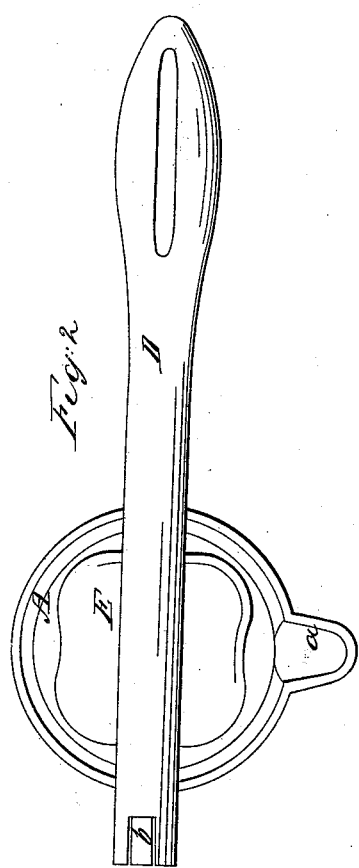
Witnesses,
W. Tusch
C. T. Hughes
Inventor
Louis S. Chichester

UNITED STATES PATENT OFFICE.

L. S. CHICHESTER, OF NEW YORK, N. Y.

LEMON-SQUEEZER.

Specification of Letters Patent No. 28,967, dated July 3, 1860.

*To all whom it may concern:*

Be it known that I, L. S. CHICHESTER, of the city, county, and State of New York, have invented a new and Improved Lemon-Squeezer; and I do hereby declare that the following is a full, clear, and exact description of the same, reference being had to the annexed drawings, making a part of this specification, in which—

Figure 1 is a side sectional view of my invention. Fig. 2 a plan or top view of the same.

Similar letters of reference indicate corresponding parts in the two figures.

The object of this invention is to obtain a simple, economical and durable implement whereby lemons may be squeezed for domestic purposes with much less power and with far greater facility than by the ordinary squeezers in general use.

The ordinary lemon squeezers require considerable power in order to express the juice fully from the lemon or rather from the half lemon which is fitted in them, in consequence of the pressure being exerted upon it axially or in the direction of its length and involving the necessity of nearly turning it inside out at the completion of the pressure. In order to avoid this difficulty I employ a cap and cone arranged substantially as hereinafter described, whereby a lateral pressure is exerted against the lemon and in such a way as to fully express the juice with a moderate application of power. I also employ in connection with the cap and cone aforesaid, a cup so arranged as to hold or retain the juice and serve as a convenient means to pour the juice into the receptacle prepared for it.

To enable those skilled in the art to fully understand and construct my invention I will proceed to describe it.

A, represents a cup which may be of cylindrical form and provided with a handle B. This cup is provided with a small nozzle $a$, and at the center of the cup there is a conical or pyramidical projection C, the apex of which is a trifle above the upper edge of the cup A as shown in Fig. 1.

At the side of the cup A, and in line with its handle B, there is a projection $b$, in the upper part of which the fulcrum pin $c$, of a lever or handle D, is placed. To this lever or handle D, there is attached a cap E. This cap E, corresponds in form with the projection C, but is somewhat larger so that it may fit over the projection C, and admit of a small space being between them. The cap E, is attached to the lever or handle D, by a pin $d$, to allow the cap to adjust itself properly over the projection C, as the lever or handle D, is lowered. This will be fully understood by referring to Fig. 1, in which the cap E, is shown in an elevated position in red outline.

The cup A, and handle B, as well as the projection C, may if desired be of metal and all be cast in one piece. The lever or handle D, and cap E, may also be of cast metal. I do not however confine myself to any particular material in the construction of the implement.

The operation is as follows: The lemon to be squeezed is cut in two in the middle as usual, and one part is placed on the apex of the projection C, the cut side being on the apex. The operator then depresses the lever or handle D, and the cap E, descends on the lemon forcing the latter down on the projection C, and subjecting the lemon to a downward and lateral pressure and effectually expressing the juice therefrom which is retained by the cup A.

It will be seen from the above description that the half lemon may be readily forced down on the projection C, in consequence of the conical or pyramidical form of the latter which like a wedge parts with facility the pulp or internal mass of the lemon and causing it, with a moderate application of power to the lever or handles B, D, to exert a very considerable pressure on the lemon and effectually express the juice therefrom which may be poured from the cup A, by simply inclining it.

This little device may be economically manufactured so as to be within the reach of all and it will be a great acquisition especially to females as the ordinary lemon squeezers require too much power to be conveniently used by them.

What I claim as my invention and desire to secure by Letters Patent is—

The combination of cap E, cone C, and cup A, substantially as and for the purpose described.

LEWIS S. CHICHESTER.

Witnesses:
WM. TUSCH,
J. W. COOMBS.